UNITED STATES PATENT OFFICE.

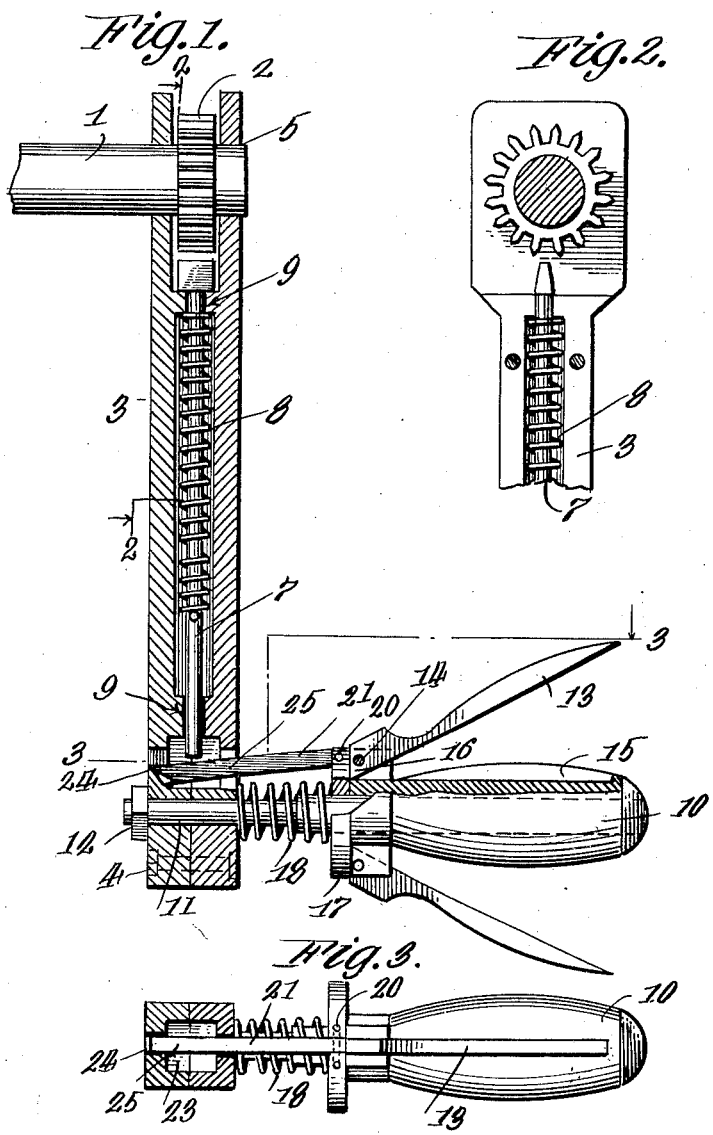

ALEXANDER C. TENNYSON, OF ALEXANDRIA, LOUISIANA.

AUTOMOBILE-CRANKER.

1,343,531.   Specification of Letters Patent.   Patented June 15, 1920.

Application filed March 24, 1919. Serial No. 284,690.

*To all whom it may concern:*

Be it known that I, ALEXANDER C. TENNYSON, a citizen of the United States, residing at Alexandria, in the parish of Rapides and State of Louisiana, have invented certain new and useful Improvements in Automobile-Crankers, of which the following is a specification.

This invention relates to machine elements, and more especially to cranks and handles; and the object of the same is to produce an improved cranker for automobiles.

A feature of the invention is to provide means whereby the crank automatically disengages itself from the shaft when the handle is released.

A secondary feature of the invention is to provide the device with means whereby when the handle is released it moves with respect to the crank, thereby permitting the action of a latch within the latter which now moves to disconnect it from the crank shaft.

The object of the device is to protect the operator against injury in case of back-fire. Details of the manner in which this object is carried out are set forth in the following specification and claims.

In the drawings:—

Figure 1 is a central vertical section through the entire device, and

Figs. 2 and 3 are sectional details on the lines 2—2 and 3—3 respectively of Fig. 1.

In the drawings the numeral 1 designates a shaft carrying a gear 2. This may be the engine shaft, although by preference it is usually the cranking shaft which stands forward of and in alinement with the shaft and is connected therewith only when it is pushed in as usual. These details are well known and need no illustration. The crank is composed of two mating members 3 connected by bolts 4 and internally formed to receive the mechanism hereinafter to be described. The upper end of the crank is journaled at 5 on the shaft astride the gear 2, and normally hangs inactive from the shaft 1 as shown in Fig. 1. Longitudinally movable within the crank is a latch whose head 6 is adapted to engage the teeth of the gear 2, but whose shank 7 is slidably mounted within the handle and is moved downward to within said crank to an inactive position by a spring 8 as shown. The shank is mounted through suitable guides 9 and its lower or outer end stands within the lower or outer end of the crank for a purpose yet to appear. When this crank is borne inward, its head is engaged with the gear, and the crank is then latched to the gear and therefore to the shaft. At other times, the crank and shaft are disconnected and the latter may revolve without swinging the crank.

The handle is made up of body 10 mounted fast on a bolt 11 which extends loosely through the outer end of the crank 3 and carries a nut 12, and two wings 13 pivoted at 14 to the inner end of the handle and adapted to lie in grooves 15 along the sides of said body when the wings are compressed. Forward of their pivots, these wings have each a nose or cam 16 against which rests a collar 17 slidably mounted on the front end of the body 10 and drawn toward it by an expansive spring 18 between the collar and the crank 3. It follows that when the wings are compressed their cams push the collar away from the body of the handle, and when the latter is moved toward the crank the bolt will slide through the same and the spring 18 is compressed.

Pivoted at 20 within one side of the collar 17 is a finger 21 which extends through a slot 22 in one side of the crank and across a chamber 23 therein, and has a beveled or undercut tip 25 resting on an incline or cam face 24 at the other side of said chamber, as best seen in Fig. 1. The position of this finger therefore causes it to pass under the tip of the shank 7 of the latch 6, which latch is moved against the tension of the spring to engage its head with the gear 2. In the drawings the cam 16 at the front end of each wing is of such size as to only start the finger forward and perhaps throw its tip under the lower end of the shank, but it is obvious that the cams might be made larger without departing from the principle of my invention.

In use, the operator grasps the handle and compresses the wings 13 into the grooves 15 which moves the collar and finger 21 forward as suggested above. The tip 25 of the finger 21 rides up the cam face 24, which causes the movement of the latch and the engagement thereof with the gear 2. Now he gives the crank 3 the rotary movement as usual in cranking an automobile. If the engine should back-fire, he of course immediately releases the crank, when the spring 18 restores the parts to the position shown in Fig. 1. Retraction of the finger 21 withdraws it from beneath the shank 7 of the latch and the spring 8 of the latter disconnects its head 6 from the gear, so that no part of the crank or its handle is forced to rotate in a reverse direction by the reverse rotation of the shaft 1 and the operator is therefore not injured.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:

1. In an automobile cranker, the combination with the crank shaft having a gear, a crank journaled on the shaft, a latch movably mounted within the crank and having a head adapted to engage said gear, said crank having a chamber near its outer end with a slot opening into one side of same, and a cam face within the other side thereof, of a bolt through the outer end of the crank, a handle and a collar on the bolt, a spring on the bolt between the crank and the collar, and a finger mounted on the collar and projecting through the slot into contact with said cam, and means for moving said collar longitudinally of said bolt.

2. In an automobile cranker, the combination with the crank shaft having a gear, a crank journaled on the shaft, a latch movably mounted within the crank and having a head adapted to engage said gear, means provided for normally holding said latch out of engagement with said gear, of a bolt through the outer end of said crank, a handle positioned upon said bolt a distance from said crank, a collar slidably mounted upon said bolt between said crank and said handle, means for causing said collar to move longitudinally upon said bolt, and a cam finger pivotally mounted on said collar, said crank having a cam surface and an aperture leading thereto through which said finger projects into contact with said cam surface.

In testimony whereof I affix my signature in presence of two witnesses.

ALEXANDER C. TENNYSON.

Witnesses:
 JNO. C. STUCKEY,
 R. E. STUCKEY.